United States Patent [19]
Lakoski et al.

[11] Patent Number: 5,575,578
[45] Date of Patent: Nov. 19, 1996

[54] REMOVABLE PAD FOR PORTABLE COMPUTER

[76] Inventors: Robert P. Lakoski, 5417 Shoalwood Ave., Austin, Tex. 78756; Roy V. Cleve, Jr., 3935 Lago Vista Dr., Austin, Tex. 78734; John P. Fetzko, 15818 Booth Circle, Volente, Tex. 78641; Jody L. Numbers, 2120 E. 6th St. #6, Tempe, Ariz. 85281

[21] Appl. No.: 225,512

[22] Filed: Apr. 11, 1994

Related U.S. Application Data

[63] Continuation of Ser. No. 903,482, Jun. 24, 1992, abandoned.

[51] Int. Cl.$^6$ ..................................................... B41J 29/00
[52] U.S. Cl. ............................................ 400/717; 400/719
[58] Field of Search ...................... 400/717–719; 38/106, 107, 135, 136; 312/208.1; 248/675, 670, 676, 231.3, 231.4, 918; 108/90, 134

[56] References Cited

U.S. PATENT DOCUMENTS

| | | | |
|---|---|---|---|
| 1,052,046 | 2/1913 | Elliott | 400/717 |
| 1,286,820 | 12/1918 | Sorensen | 400/717 |
| 2,324,247 | 4/1942 | Ullman | 312/208.1 |
| 2,535,743 | 12/1950 | Lundahl | 400/717 |
| 2,958,559 | 3/1958 | Jensen | 248/231.3 |
| 3,080,141 | 11/1961 | Ricci | 38/107 |
| 3,951,371 | 4/1976 | Hoes | 248/231.3 |
| 4,088,081 | 5/1978 | D'Arca | 248/231.4 |
| 5,119,742 | 6/1992 | Simmie | 248/231.4 |
| 5,190,387 | 3/1993 | Auth | 400/717 |
| 5,253,836 | 10/1993 | Tso | 248/918 |

OTHER PUBLICATIONS

Murphy "Bench Supported Pan Holder" Technical Digest, No. 44, Nov. 1976, pp. 41–42.
Little Mouse ADB Advertisement shown on p.56 of *Hardware Input Devices*.
Advertisement for "Thumbelina" The World's Most Portable Mouse?; p. 443, May 12, 1992, PC Magazine.
Advertisement for Microsoft® Ballpoint™ Mouse.
Advertisement for MicroTRAC.
Advertisement for CompuADD Express.
Advertisement for Desktop Direct from Digital.
Advertisement for PenMate™.

*Primary Examiner*—Edgar S. Burr
*Assistant Examiner*—Anthony H. Nguyen
*Attorney, Agent, or Firm*—Gambrell, Wilson & Hamilton

[57] ABSTRACT

A mouse paid (10) is disclosed which can be attached conveniently to a portable computer (12). The pad has a lip (30) which fits over the border (18) of the keyboard on a personal computer and a spring loaded clamp slide (42) which engages the outer surface (24) of the keyboard to secure the pad on the portable computer. A pad (72) can be provided with keys (74).

2 Claims, 3 Drawing Sheets

REMOVABLE PAD FOR PORTABLE COMPUTER

This is a continuation of application Ser. No. 07/903,482 filed on Jun. 24, 1992, now abandoned.

TECHNICAL FIELD OF THE INVENTION

This invention relates to the personal computer industry, and in particular to an accessory pad for use with a portable or notebook computer.

BACKGROUND OF THE INVENTION

Many personal computer operators use a mouse in operating the computer. Typically, the mouse, a small electronic box on rollers, is moved about a hard flat surface known as a pad. While the mouse can be used on certain surfaces, such as a table top, with some success, it is more common to have a dedicated pad on which to move the mouse.

With a stationary personal computer, it is usually straightforward to find an area to place the pad and mouse on a semi-permanent basis. However, with a portable or notebook type computer, it is often inconvenient to find a suitable space to put the pad and mouse near the computer, and the size of the typical pad makes it difficult to use with the portable computer on the road. Therefore, a need exists to develop a more effective mouse and pad which is more readily adapted for use with a portable computer.

SUMMARY OF THE INVENTION

In accordance with one aspect of the present invention, a pad is provided for attachment to a portable computer, the computer having a keyboard. The keyboard has a plurality of keys with an inside surface adjacent the keys and an outside surface parallel the inside surface. The pad includes a base having a lip engaging the inside surface of the keyboard and structure mounted to the base for engaging the outside surface of the keyboard to clamp the pad to the keyboard between the surfaces. The base can form a pad for use of a mouse or could be used to mount additional keys to input data to the computer.

The structure for mounting the base can include a ramp surface on the base at an angle relative to the outer surface on the keyboard. A clamp is provided which has a ramp surface to engage the ramp surface on the base and an engagement surface for contacting the outer surface of the keyboard. A spring acts between the base and the clamp to urge the clamp outward along the ramp surfaces and into engagement with the outer surface of the keyboard.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
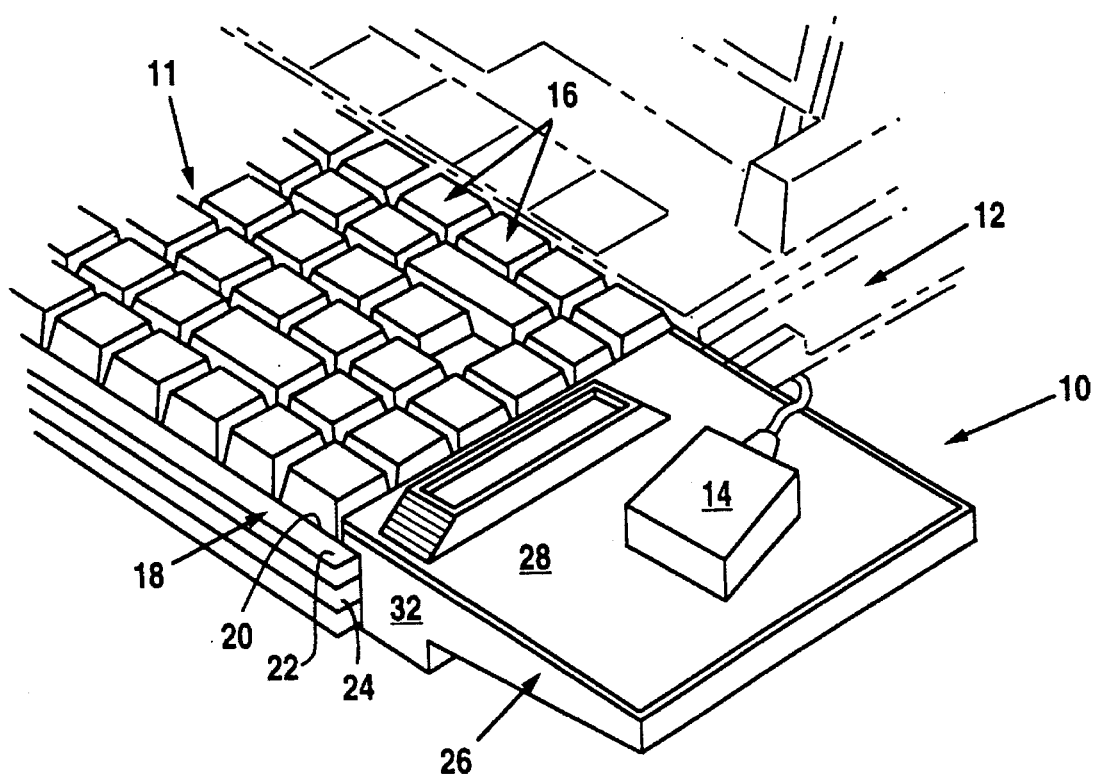
FIG. 1 is a perspective view of a pad forming a first embodiment of the present invention.
Figure 3:
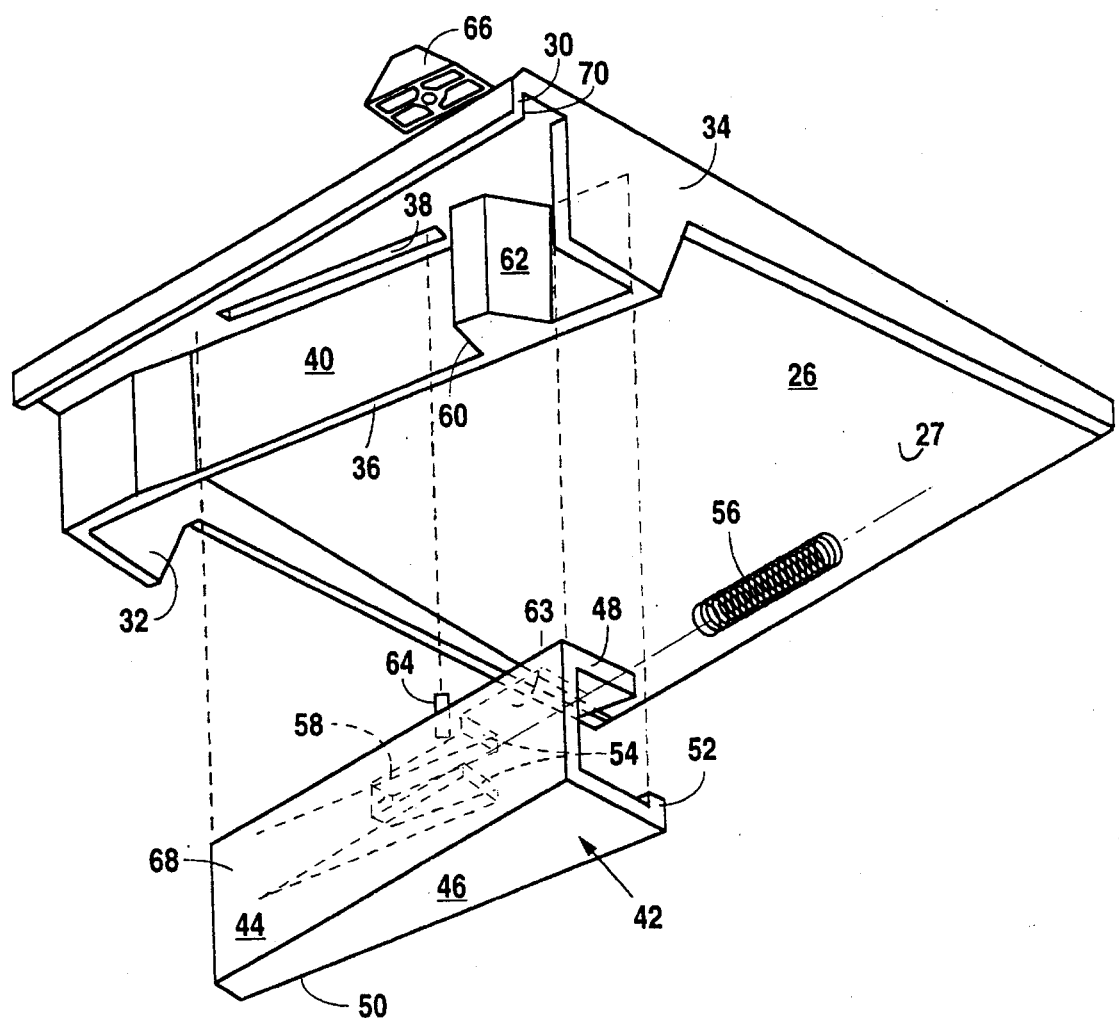
FIG. 3 is a perspective exploded view of the pad of FIG. 1.

With reference now to the accompanying drawings, wherein like and corresponding parts throughout the several views are identified by identical reference numerals there is shown in FIGS. 1 and 3 a mouse pad 10 forming a first embodiment of the present invention which is mounted to a notebook or portable computer 12 permitting the use of a mouse 14 with the portable computer 12.

As can be seen in FIG. 1, the portable computer 12 has a series of keys 16 built into the keyboard 11 which are surrounded by the border 18 of the keyboard 11. The border 18 has a continuous inner surface 20 which faces the keys 16, a top surface 22 and an outside surface 24 which forms the outer periphery of the keyboard 11.

The mouse pad 10 is formed with a base 26 having a top 27. Top 27 has a flat upper surface 28 forming the pad itself. The base also has a downwardly turned lip 30 at one edge of the surface 28. Reinforcing brackets 32 and 34 extend downwardly from the surface on opposite edges. A ramp 36 is formed between the top 27 and reinforcing brackets. Ramp 36 is spaced some distance from the lip 30. A notch 38 is formed through the top 27 closely adjacent the ramp surface 40 formed on the ramp 36.

A clamp slide 42 is mounted on the base for movement up and down the ramp surface 40. The clamp slide 42 has an overall wedge shape formed by front 44 and sides 46 and 48. Each side defines a ramp surface 50 which is angled at an acute angle relative to the front 44. The ramp surfaces 50 engage the ramp surface 40 on the base 26. A lip 52 extends from the side 48 to fit around the back side of the ramp 36. The inside of front 44 and side 46 define projections 54 to confine a compression spring 56 which engages surface 58 on the clamp slide and surface 60 on projection 62 from the ramp 36. A cut out 63 in side 48, seen in phantom line in FIG. 3, allows the clamp slide to slide up towards top 27 to install the clamp slide on the base. Once the clamp slide is slid onto the base such that the projection 62 is between sides 46 and 48, the clamp slide is allowed to move outward under the influence of spring 56 so that the cut out 63 and the projection 62 are no longer aligned and the clamp slide will stay on the base. A pin 64 extends from the side 48 and through the notch 38 in the base. A finger slide 66 is secured, either by glue, other adhesive or mechanical engagement with the pin 64.

As can be understood, the spring 56 urges the clamp slide 42 outward along the ramp surface 40 so that the engaging surface 68 on the front 44 of the clamp slide will move closer to the lip 30. The finger slide can be manually activated to pull the clamp slide 42 inward relative to lip 30 against the force of the spring 56.

When the pad 10 is to be fixed to the portable computer, the operator will move the finger slide 66 and the clamp slide 42 against the force of the spring to move the clamp slide the furthest distance possible away from the lip 30 so that the pad can be fit over the border 18 on the portable computer. The inside surface 70 of the lip 30 will engage the inner surface 20 of the border 18. The operator then releases the finger slide 66, permitting the spring 56 to force the clamp slide 42 outward and up the ramp surface 50 until the engaging surface 68 moves into frictional engagement with the outside surface 24 of the border 18. The pad 10 will rest partly on top of the top surface 22 and the pad will be securely attached to the portable computer 12. It should be noted the pad can be mounted on the left side, right side, or front of the keyboard of the computer, making it easy for both left and right handed operators.

Figure 2:
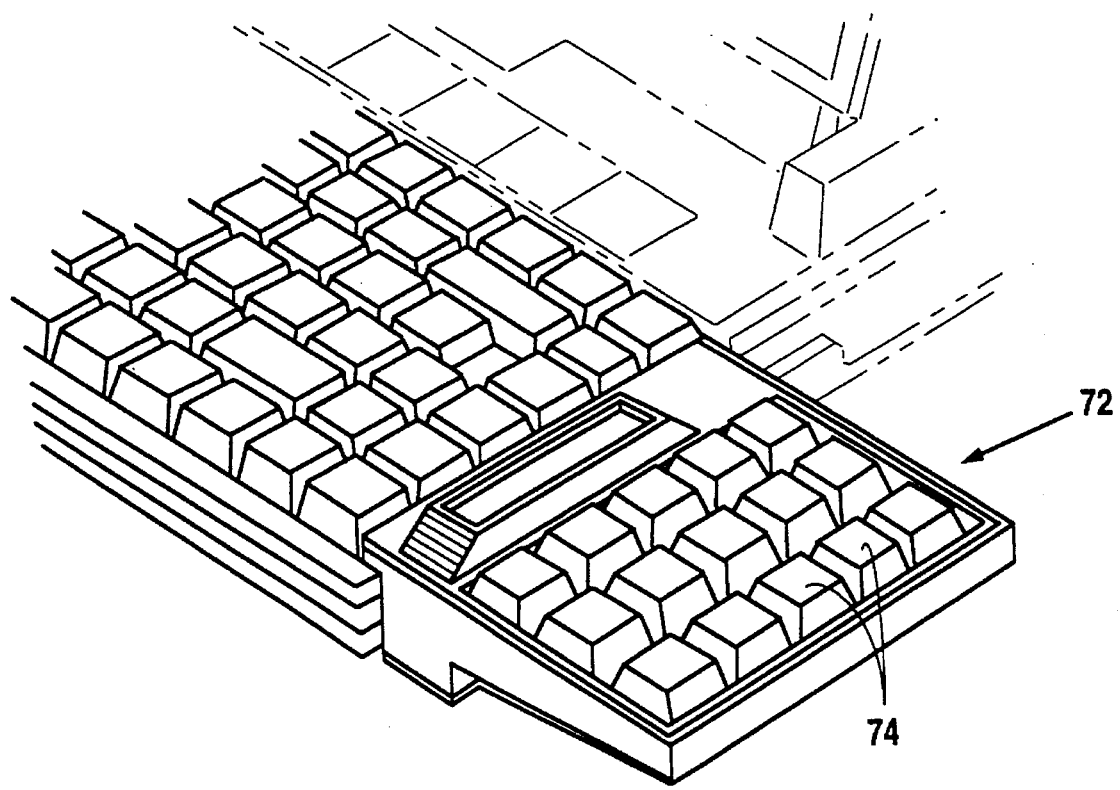
FIG. 2 is a perspective view of a pad with keys forming a modification of the pad of FIG. 1.

As illustrated in FIG. 1, mouse pad 10 is intended for use with a mouse 14. However, mouse pad 72, illustrated in FIG. 2, can have essentially the same features as pad 10 described above, but includes additional keys 74 mounted on the base 26. In all other matters related to attaching the pad 72 to the pad 10, the pad 72 is identical to pad 10.

It also should be understood that pad 10 and pad 72 could be used with the keyboard of a fixed non-portable computer as well. Some operators like to place the keyboard in their lap, or on a surface somewhat remote from the computer. It would be convenient to have the pad 10 or pad 72 attached to the keyboard so that the operator can move the keyboard and pad as one unit. Essentially, the design of the keyboard 11 is the same as the keyboard of a regular, non-portable computer, and FIGS. 1 and 3 essentially show how the pads 10 and 72 would be mounted on a conventional keyboard by simply assuming keyboard 11 is the keyboard of a non-portable computer. The description and drawings of how the pad is attached to the keyboard 11 above would apply to attaching the pad to the keyboard of a non-portable computer as well.

Although a single embodiment of the invention has been illustrated in the accompanying drawings, and described in the foregoing detailed description, it will be understood that the invention is not limited to the embodiment disclosed, but is capable of numerous rearrangements, modifications and substitutions of parts and elements without departing from the scope and spirit of the invention.

We claim:

1. A pad platform for attachment to a computer, the computer having a keyboard, the keyboard having a plurality of keys, an inside surface adjacent the keys and an outside surface parallel the inside surface, comprising:

a base having a lip engaging the inside surface of the keyboard, said base forming a platform to support pad for the use of a computer mouse;

means mounted to the base for engaging the outside surface of the keyboard to clamp the pad to the keyboard between the surfaces, wherein the means for engaging the outside surface of the keyboard include a ramp surface on the base at an angle relative to the other surface, a clamp having a ramp surface to engage the ramp surface on the base and an engagement surface for contacting the outer surface of the keyboard, and a spring acting between the base and the clamp to urge the clamp outward along the ramp surfaces and into engagement with the outer surface.

2. The pad of claim 1, said base having an upper and lower surface, said ramp surface of said clamp positioned beneath the lower surface and a finger slide switch positioned above the upper surface and connected to said ramp through a slot in said base.

* * * * *